Dec. 2, 1969 E. C. DOWLING 3,482,221
BINARY BIT COUNTER
Filed July 14, 1964
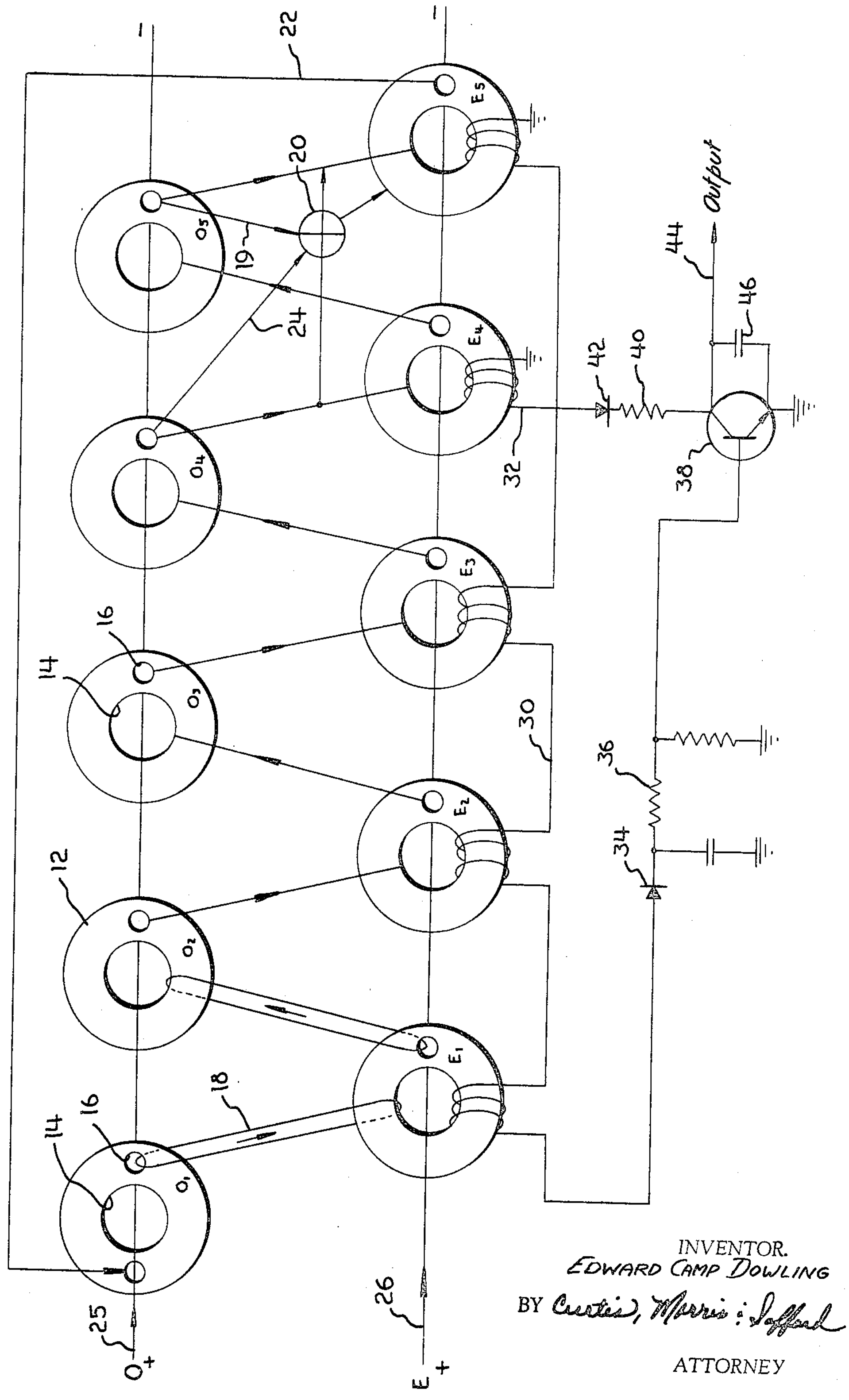
INVENTOR.
EDWARD CAMP DOWLING
BY Curtis, Morris & Safford
ATTORNEY

United States Patent Office 3,482,221

Patented Dec. 2, 1969

3,482,221

BINARY BIT COUNTER

Edward Camp Dowling, Harrisburg, Pa., assignor to AMP Incorporated, Harrisburg, Pa.

Filed July 14, 1964, Ser. No. 382,583

Int. Cl. G11b *5/00*

U.S. Cl. 340—174 1 Claim

ABSTRACT OF THE DISCLOSURE

A code pattern detector is disclosed including a plurality of memory elements interconnected for transfer of binary information and including auxiliary output windings linking such elements in a predetermined pattern to a common detector element. The pattern connection to the elements and to the detector provides an output for one and only one pattern of binary information stored in such elements with any different binary pattern resulting in no output from the detector.

There are many applications, such as in measuring time, where we would like to produce an output signal on the occurance of a particular binary pulse sequence (that is, a train of binary ones and zeroes in a given order). In the inventor's co-pending U.S. application, Ser. No. 321,941, filed Nov. 6, 1963, now U.S. Patent No. 3,300,775, there is disclosed an overall magnetic core circuit for generating a sequence of pulse trains and for recognizing and giving an output signal in response to a predetermined sequence of pulses. The circuit included a maximal feedback shift register having *n* number of bits of binary memory which could be sequenced through a total of $2^n-1$ different pulse trains. Any desired one of these pulse trains could be recognized or detected by means of a second circuit having essentially as many components and costing approximately the same as the feedback shift register itself. Thus, when a binary train or count (for example, zero, zero, zero, one, zero) was to be recognized in the feedback shift register, a similar train of as many pulses was generated in the second or detector circuit. The present invention provides a considerably simplified detector circuit for a binary circuit of this general kind.

SUMMARY OF THE INVENTION

This invention relates to a counter or detector arrangement for a binary pulse sequencing circuit, more particularly the invention relates to an improved count detector for a magnetic core information register.

An object of this invention is to provide a simple, reliable and inexpensive count detector circuit for a binary pulse sequencer.

A further object is to provide a detector which is particularly suitable for and operates harmoniously with a magnetic core binary pulse sequencer.

A more specific object is to provide such a detector which is powered solely by the magnetic cores to which it is connected.

These and other objects will in part be understood from and in part pointed out in the following description.

In the present invention, in one specific embodiment thereof, certain of the magnetic cores of a feedback shift register are also made to serve as part of the detector for any particular sequence of pulses. Any desired sequence of pulses can be detected by selecting the proper pattern for wiring of the magnetic cores into the detector circuit. This arrangement reduces the number of components in the overall circuit while at the same time allowing as much flexibility as could be desired in choosing the particular count or pulse sequence to be detected. Moreover, the other elements of the detector circuit are powered or driven solely by the energy derived from the magnetic cores of the shift register sequencer itself. Thus the count detector is not only inexpensive, but is highly efficient.

A better understanding of the invention together with a fuller appreciation of its many advantages will best be gained from the following description given in connection with the single figure of drawing which shows a schematic circuit of a magnetic core sequencer and detector arrangement embodying the invention.

The circuit 10 shown in the drawing includes an upper group of multiaperture magnetic cores 12 (five such cores being shown) and a lower group of the same number. The upper cores for convenience will be referred to as the "odd" cores and designated O–1 through O–5. Similarly the lower cores are the "even" ones and numbered E–1 through E–5.

Each core has a large central aperture 14 and a minor output aperture 16. Each core from O–1 to E–4 is connected to the adjacent core by a respective one of the coupling loops 18; core O–5 is connected by a loop 19 to one input of an "exclusive-or" element 20, the output of which is applied to the input of core E–5. The output of the latter is connected to the first core O–1 by a return loop 22. The other input of "exclusive-or" 20 is connected via a loop 24 to receive the output of core O–4. Information is transmitted from one core to the next by means of currents induced in the respective coupling windings when flux about the minor aperture of the core is set and then reversed in proper sequence. The odd group of cores is cyclically energized, or reset, by means of pulses applied to an advance winding 25 which threads all of the odd cores; similarly the even cores are threaded by a winding 26 which is energized in proper sequence relative to the odd advancing winding. The actual wiring patterns of the drive windings so far described, and a detailed explanation of the operation of a magnetic core circuit generally like the one here, is given in U.S. Patent 2,995,731 to Sweeney. Briefly, this operation consists of transmitting the informaiton, either a "one" or a "zero" in one core to the next when winding 25 or 26 is properly energized. Thus a "one" in core O–1 is transmitted to core E–1, thence to core O–2, and so on down the circuit. In this way any sequence of binary pulses can be propagated along the cores.

The magnetic cores in circuit 10 are connected as a maximal feedback shift register. A detailed explanation of the operation of this kind of shift register is given in U.S. patent application, Ser. No. 321,941, filed Nov. 6, 1963, now U.S. Patent No. 3,300,775. There are $2^n-1$ possible combinations or code patterns of "ones" and "zeroes" which can be generated in such a shift register. Here, in the embodiment illustrated, $n=5$, and the maximum number of different patterns which can be generated is 31. The detector provided will detect or identify one pattern out of the total number. In the embodiment illustrated, the pattern "zero, zero, zero, one, zero" will be detected each time it appears, as will be explained.

The major apertures of cores E–1, E–2, E–3 and E–5 are threaded by an auxiliary winding 30 which comprises one input of the detector arrangement according to the invention. Core E–4 is similarly threaded by another auxiliary winding 32 which is the other input of the detector. Winding 30 is connected via a diode 34 and a suitable pulse-shaping filter 36 to the base of an NPN transistor 38. The emitter of this transistor is connected to ground and its collector is connected via a de-coupling or load resistor 40 and a diode 42 to winding 32. An output from the detector is obtained via lead 44 which is bypassed to ground through a small filter capacitor 46.

When transistor 38 is "off," a positive signal from lead

32 can reach output 44, but this happens only in the event that a positive signal is generated on lead 32 and no signal is generated on lead 30. This occurs only when a "one" is shifted into core E–4, and "zeroes" shifted into cores E–1, E–2, E–3 and E–5. If a positive signal appears on lead 30, simultaneously with a positive signal on lead 32, transistor 38 will turn on and effectively short the lower end of resistor 40 to ground, thereby preventing the signal on lead 32 from reaching output 44. On the other hand, if there is no signal on lead 32, no signal will reach the output. Thus any code pattern different from "zero, zero, zero, one, zero" will fail to produce an output signal. Of course, appropriate changes in the wiring patterns of windings 30 and 32 will permit the detecting of other code patterns.

The above description is intended in illustration and not in limitation of the invention. Various modifications or changes in the embodiment shown may occur to those skilled in the art, and these may be made without departing from the spirit or scope of the invention as set forth.

I claim:

1. A code pattern detector of the character described comprising a plurality of magnetic cores, input means to serially input binary intelligence to said cores, a detector transistor, an output winding means linking said cores connected to said transistor, said winding means threading said cores in a predetermined pattern and connected to said transistor to energize said output only when a desired code train is in said cores, winding means including a first portion conected to the core or cores which should have zeroes in them and to said transistor, and a second portion connected to the core or cores which should have ones and to said transistor, said first winding portion including a strand of wire threading each core which should have a zero, and a blocking diode and a pulse shaper in series with said strand, first and second terminals of said transistor being connected in a closed loop with said strand, diode and shaper, said second winding portion including a second strand of wire threading each core which should have a one and a blocking diode and a load resistor in series with said second strand, second and third terminals of said transistor being connected in a closed loop with said second strand, diode and resistor.

References Cited

UNITED STATES PATENTS

| | | | |
|---|---|---|---|
| 3,098,157 | 7/1963 | Enomoto et al. ______ | 307—88 |
| 3,329,827 | 7/1967 | Kihn et al. __________ | 307—88 |
| 3,371,218 | 2/1968 | Russell _____________ | 307—88 |
| 2,955,264 | 10/1960 | Kihn et al. | |
| 3,210,743 | 10/1965 | Kaenel. | |

STANLEY M. URYNOWICZ, Jr., Primary Examiner

U.S. Cl. X.R.

340—146.2